United States Patent [19]

Inaba

[11] 3,806,786

[45] Apr. 23, 1974

[54] MOTOR DRIVING SERVO SYSTEM FOR A TAPE RECORDER

[75] Inventor: Masao Inaba, Tokyo, Japan

[73] Assignee: Nippon Electric Company, Limited, Tokyo, Japan

[22] Filed: Jan. 30, 1973

[21] Appl. No.: 327,934

[30] Foreign Application Priority Data

Feb. 3, 1972 Japan ................................ 47-12616

[52] U.S. Cl. ................ 318/314, 318/318, 178/6.6 P

[51] Int. Cl. ............................................. H02p 5/06

[58] Field of Search .......... 318/314, 318; 178/6.6 P, 178/6.6 A

[56] References Cited

UNITED STATES PATENTS

| | | | |
|---|---|---|---|
| 3,395,326 | 7/1968 | Hebb | 178/6.6 P |
| 3,567,850 | 3/1971 | Habel | 178/6.6 P |
| 3,621,353 | 11/1971 | Matley | 318/314 |
| 3,668,492 | 6/1972 | Konishi et al. | 318/314 |

*Primary Examiner*—B. Dobeck

*Attorney, Agent, or Firm*—Sandoe, Hopgood & Calimafde

[57] ABSTRACT

A servo system for a video tape recorder or the like is disclosed having a transducer head for recording and/or reproducing a control signal to control the phase of rotation of a capstan and/or head motor. The reproduced control signal is phase- or frequency-compared with a stable reference signal or a tachometer pulse to produce an error signal which controls the frequency of the power signal that drives the motor. Before the comparison, at least one of the two signals to be compared is phase- or frequency-modulated by the error signal.

10 Claims, 2 Drawing Figures

PATENTED APR 23 1974 3,806,786

MOTOR DRIVING SERVO SYSTEM FOR A TAPE RECORDER

BACKGROUND OF THE INVENTION

This invention relates generally to servo systems for tape recorders, and more particularly to a servo system for a video tape recorder or the like having a transducer head for reproducing a control signal for controlling the rotation of a capstan motor and/or a head motor.

In a video tape recorder, video tracks are formed by at least one video head on a magnetic tape in a direction different from the tape transportation direction. For the reproducing video head to accurately trace the video tracks during reproduction, a control signal that is synchronized with the vertical synchronizing signal of the video signal to be recorded is recorded by a control head on the tape to form a control track in the tape transportation direction. During reproduction, the reproduced control signal is used to control a motor driving power source so that the reproducing video head accurately traces the video tracks.

However, the reproduced control signal comprises not only the tracking information to be reproduced but also frequently includes phase-fluctuation such as jitter, wow or flutter introduced by the mechanism employed for tape transportation. In addition to these undesired components, a modulating component coming in at the automatic tracking system is also included in the reproduced signal. These undesired phase-fluctuation components cause incorrect tracking by the reproducing video head, which in turn results in fluctuations on the reproduced picture.

For example, in a video tape recorder for home use, the phase of rotation of the rotary video head is controlled to maintain a predetermined phase relationship with the reproduced control signal. The phase fluctuation contained in the reproduced control signal increases the fluctuation in the phase of rotation of the rotary head. This results in an increase in the fluctuation in the reproduced picture.

It is therefore an object of this invention to provide an improved motor driving servo system for a tape recorder, in which the reproduced signal is not adversely influenced by the phase fluctuation contained in the reproduced control signal.

SUMMARY OF THE INVENTION

According to this invention, there is provided an improved motor driving servo system for a tape recorder having a control head for recording and/or reproducing a control signal for controlling the phase of rotation of the capstan and/or head motor. The reproduced control signal is phase- or frequency-compared with a stable reference signal or a tachometer pulse to produce an error signal which controls the frequency of a motor driving power signal. Before the comparison, at least one of the two signals to be compared is phase- or frequency-modulated by the phase-fluctuation component of the control signal contained in the error signal.

In a tape recorder that includes a motor driving servo system according to this invention, the reproduced signal is hardly influenced by phase fluctuation in the control signal. As a result, transverse fluctuation does not appear in the reproduced picture.

BRIEF DESCRIPTION OF THE DRAWINGS

The features and advantages of this invention will be understood from the following detailed description of preferred embodiments of this invention taken in conjunction with the accompanying drawing, wherein.

DESCRIPTION OF INVENTION

Figure 1:
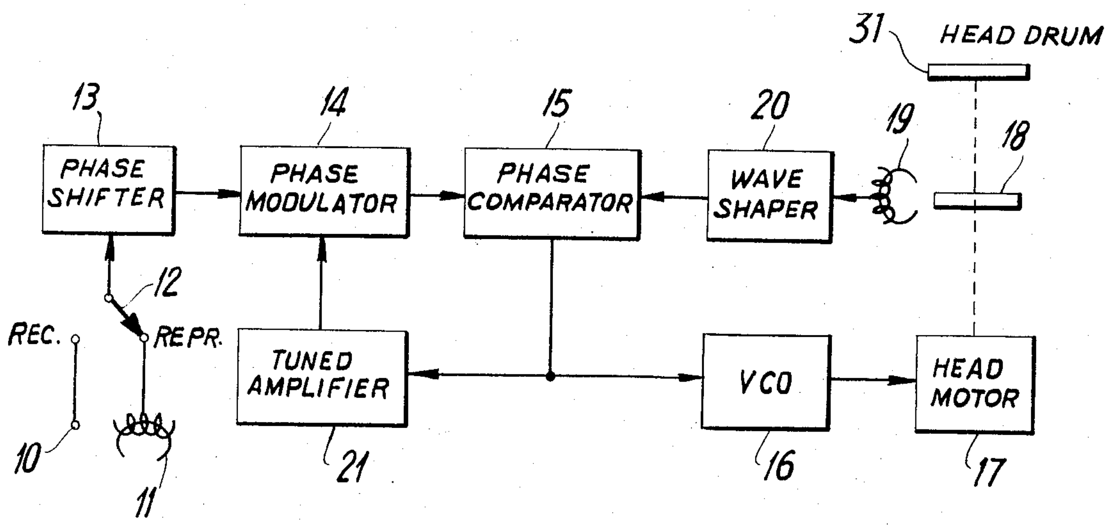
FIG. 1 is a block diagram of a drum servo system according to one embodiment of this invention.

Referring to the embodiment of the invention illustrated in FIG. 1, a drum servo system comprises an input terminal 10 for receiving a synchronizing signal of a video signal to be recorded and a control head 11 for recording and reproducing a control signal. A switch 12 connects either terminal 10 or control head 11 to the input of a phase-shifter 13, depending on the position of the switch. Phase-shifter 13 is similar to the phase adjuster 13 employed in the servo system disclosed in the Konishi et al. U.S. Pat. No. 3,668,492 assigned to the assignee of the present application. A phase modulator 14 is connected to the output of phase shifter 13, and a phase comparator 15 is connected to the output of the modulator. A variable frequency oscillator 16 such as a voltage controlled oscillator is connected to a head motor 17, which in turn is mechanically coupled to a timing plate 18 and a head drum 31 having rotary heads. A tachometer head 19 is coupled to a wave shaper 20 the output of which is connected to the other input of phase comparator 15. A tuned amplifier 21 has an input connected to the output of phase comparator 15 and an output connected to the input of phase modulator 14.

During reproduction of the recorded video signal, the switch 12 is in the state as shown in FIG. 1. The control signal reproduced by the control head 11 is applied to the phase shifter 13 where it is phase shifted so as to bring the phase of rotation of a head drum into coincidence with the desired phase. The phase shifted control signal from the phase shifter 13 is supplied to the phase comparator 15 after being phase-modulated by the phase modulator 14.

A reference signal in the form of a tachometer pulse is generated by the tachometer head 19 at a rate of one pulse per revolution of the timing plate 18 coupled to the head drum shaft. The tachometer pulse is applied to the phase comparator 15 through the wave shaper 20. In the phase comparator 15, the control signal and the tachometer pulse are phase-compared with each other to produce an error signal. That error signal is applied to the variable frequency oscillator 16 to control the output frequency of the oscillator. The output of the oscillator 16 drives the head motor 17 coupled to the head drum.

Furthermore, the error signal from the phase comparator 15 is also applied to the phase modulator 14 through the tuned amplifier 21.

The servo system of the embodiment illustrated in FIG. 1 differs from a conventional servo system in that the latter does not have the phase modulator 14 and the tuned amplifier 21. Because the phase shifted control signal is phase-compared with the tachometer pulse without phase-modulation in the conventional system, the error signal contains the phase fluctuation component of the control signal. This results in the fluctuation of rotation of the head drum.

In the system according to this invention, those phase-fluctuation components contained in the error signal which are higher in frequency than 1 Hz, for example, and which represent the phase fluctuation of the reproduced control signal, are applied through the tuned amplifier 21 to the phase modulator 14 so as to form a phase-modulation negative feedback loop including the phase modulator 14, the phase comparator 15, and the tuned amplifier 21. Therefore, the phase fluctuation of the reproduced control signal is compressed at a rate defined by the bandwidth and the gain of the negative feedback loop. As a result, the fluctuation of rotation of the head drum is removed, and the video head accurately scans the video tracks.

The switch 12 may be in a position opposite to that shown in the drawing, that is, connected to terminal 10, when the synchronizing signal of a video signal to be recorded is used instead of the reproduced control signal.

In a video tape recorder for home use which comprises a conventional drum servo system without a phase modulation negative feed back loop, such as that described above, the measured jitter is about 10 μsec (*p*—*p*) during recording, and 150 – 200 μsec (*p*—*p*) during reproduction. In contrast, in the servo system according to this invention which includes the phase modulation negative feed back loop having, for example, a bandwidth of 0.5 – 10 Hz and a gain of 20, the jitter during reproduction is decreased to 20 – 25 μsec (*p*—*p*) and that for recording is reduced to a negligible level. This makes it possible to produce a recorded signal for an ordinary home-use television receiver, even though the reproduced video signal having a phase fluctuating control signal requires a specific television receiver comprising a horizontal deflection circuit of a small time constant.

Figure 2:
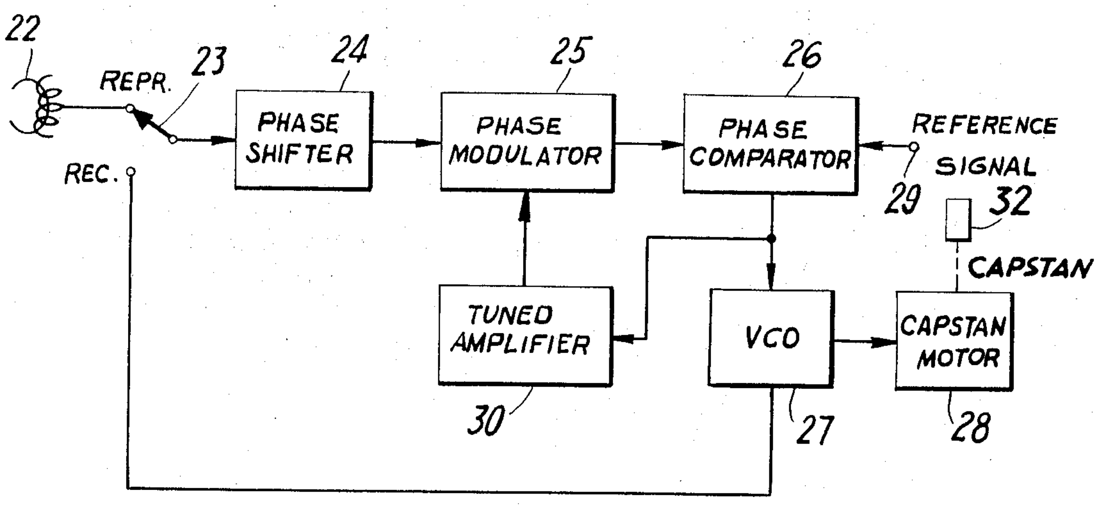
FIG. 2 is a block diagram of another embodiment of a capstan servo system according to this invention.

Referring to the embodiment of the invention illustrated in FIG. 2, a capstan servo system comprises a control head 22 coupled by a switch 23 to the input of a phase shifter 24, the output of which is connected to a phase modulator 25. A phase comparator 26 has one input connected to the output of phase modulator 25, and an output connected to a variable frequency oscillator 27. The output of oscillator 27 is applied to drive a capstan motor 28 for driving a capstan 32, and an input terminal 29 for receiving a reference signal is connected to the other input of phase comparator 26. A tuned amplifier 30 is interposed between the output of phase comparator 26 and phase modulator 25.

During reproduction, the switch 23 is in the state as shown in FIG. 2. The reproduced control signal is supplied to the phase comparator 26 through the switch 23, the phase shifter 24, and the phase modulator 25, and is compared by phase comparator 26 with a stable reference signal applied through the input terminal 29 to produce an error signal. The error signal output from the phase comparator 26 is applied to the oscillator 27 to control the frequency of the driving signal for the capstan motor 28. The phase fluctuation components of the error signal are applied through the tuned amplifier 30 to the phase modulator 25 so as to form a phase modulation negative feedback loop, which compensates for the phase fluctuation of the control signal.

Although the invention has been described above in conjunction with a phase-control type servo system for a video tape recorder, it will be obvious to those skilled in the art that this invention is also readily applicable to a frequency-control type servo system, and to such other types of tape recorders as an audio tape recorder and a data recorder. Furthermore, it will be obvious that the reference signal or the tachometer pulse rather than the reproduced control signal may be modulated.

What is claimed is:

1. A servo system for a tape recorder or the like having a transducer head for reproducing a control signal to control the phase of rotation of a motor, said system comprising:

means for comparing a predetermined characteristic of the reproduced control signal with a reference signal to produce an error signal having relatively low frequency components and relatively high frequency components;

means for generating a driving signal for said motor, the frequency of said driving signal being determined in response to said error signal; and means for modulating one of the reproduced control signal and said reference signal by the relatively high frequency components of said error signal.

2. The servo system as claimed in claim 1, wherein said reproduced control signal is modulated at said modulating means.

3. The servo system as claimed in claim 1, wherein said tape recorder is a video tape recorder for a television signal having at least one rotary head for reproducing said television signal.

4. The servo system as claimed in claim 3, wherein said motor drives said rotary head and said reference signal is a tachometer pulse representing the phase of rotation of said rotary head.

5. The servo system as claimed in claim 3, wherein said motor drives a capstan for transporting the tape.

6. The servo system as claimed in claim 1, wherein said characteristic of said reproduced control signal is phase, said comparing means comprising phase comparing means.

7. The servo system as claimed in claim 6, wherein said modulating means comprises phase modulating means.

8. The servo system as claimed in claim 7, further comprising tuned amplifier means operatively interposed between said phase comparing means and said phase modulating means for applying said relatively high frequency components of said error signal to said phase modulating means.

9. The servo system of claim 8, in which said driving signal generating means comprises a voltage controlled oscillator connected to the output of said phase comparing means.

10. The servo system as claimed in claim 8, further comprising tachometer means for producing said reference signal representing the phase of rotation of said motor.

* * * * *